United States Patent [19]
Fields

[11] 4,212,573
[45] Jul. 15, 1980

[54] BROACHING MACHINE IMPROVEMENTS

[75] Inventor: George C. Fields, Wilmette, Ill.

[73] Assignee: Ty Miles, Inc., Westchester, Ill.

[21] Appl. No.: 848,909

[22] Filed: Nov. 7, 1977

[51] Int. Cl.² ...................... B26D 37/08; B26D 41/06
[52] U.S. Cl. .................................... 409/251; 409/257;
409/263; 409/266; 409/268; 409/272
[58] Field of Search .................. 90/79, 80, 82, 83, 84,
90/85, 87, 88, 92, 93, 96, 67, 71, 72, 73, 76, 77,
63; 409/251, 257, 263, 266, 268, 272

[56] References Cited
U.S. PATENT DOCUMENTS

| | | | |
|---|---|---|---|
| 1,864,322 | 6/1932 | Sandler | 90/72 |
| 2,002,924 | 5/1935 | Romaine et al. | 90/84 X |
| 2,024,252 | 12/1935 | Romaine et al. | 90/84 X |
| 2,072,563 | 3/1937 | Lynch et al. | 90/83 X |
| 2,263,390 | 11/1941 | Lapointe | 90/93 |
| 2,343,420 | 3/1944 | Podesta | 90/93 X |
| 2,647,443 | 8/1953 | Weisberger et al. | 90/93 |

*Primary Examiner*—Z. R. Bilinsky
*Attorney, Agent, or Firm*—Darbo & Vandenburgh

[57] ABSTRACT

Two vertically movable carriages are alternately reciprocated. Each carriage holds two broaches positioned at opposite sides of the ways that guide the carriage. In one embodiment workpieces are moved from a magazine between the carriages alternately to work stations beside each carriage. In another embodiment the workpieces are moved between the two broaches in a series of three steps, the first broach acting on a given workpiece during a dwell before the first step and the second broach acting on that workpiece during a dwell after the third step. In yet another embodiment the workpieces are held by a chuck which, between successive broaching strokes, rotates the workpiece about an axis normal to the broaching strokes.

11 Claims, 21 Drawing Figures

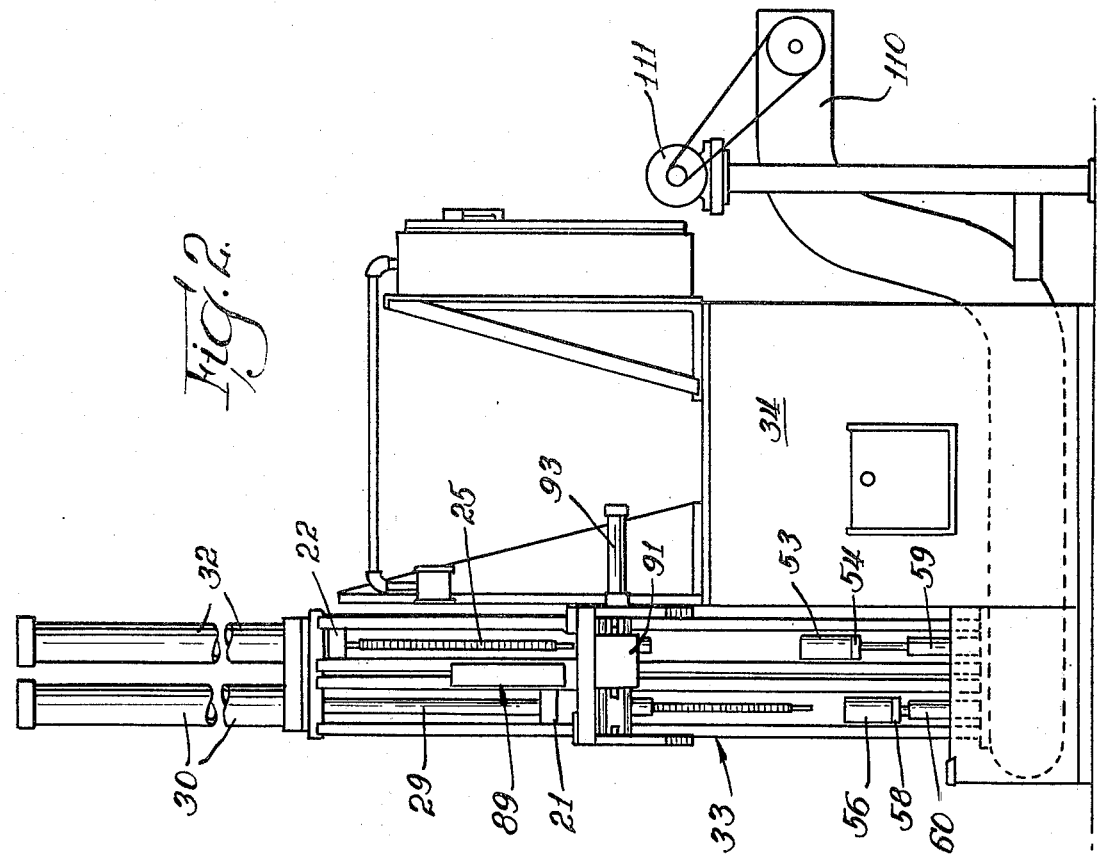
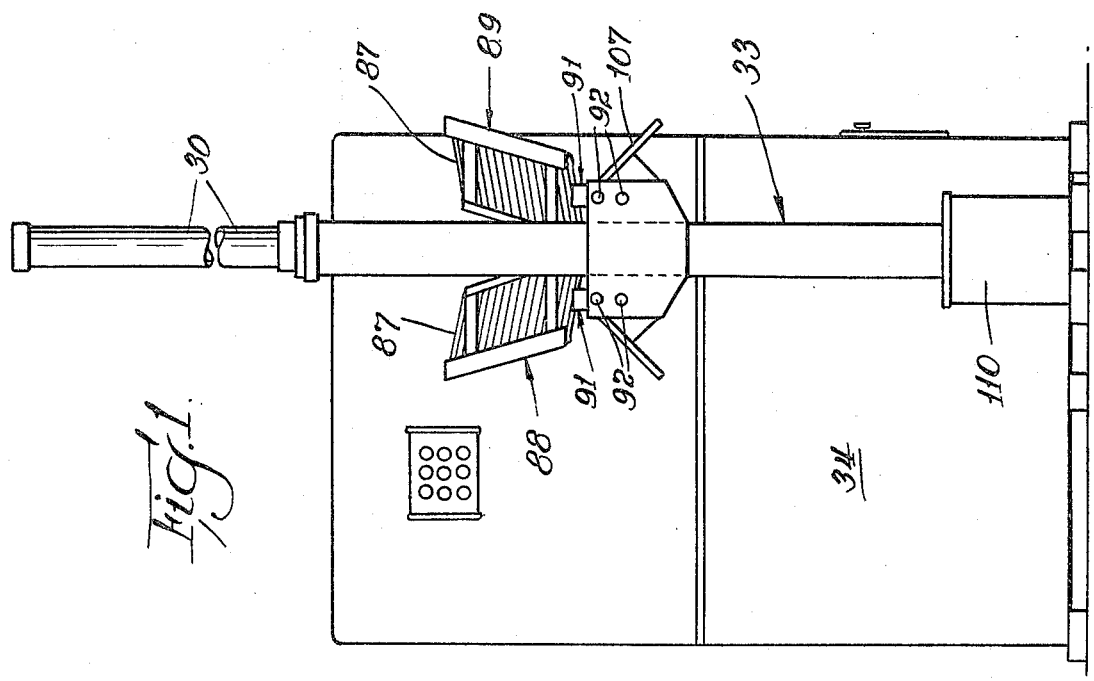

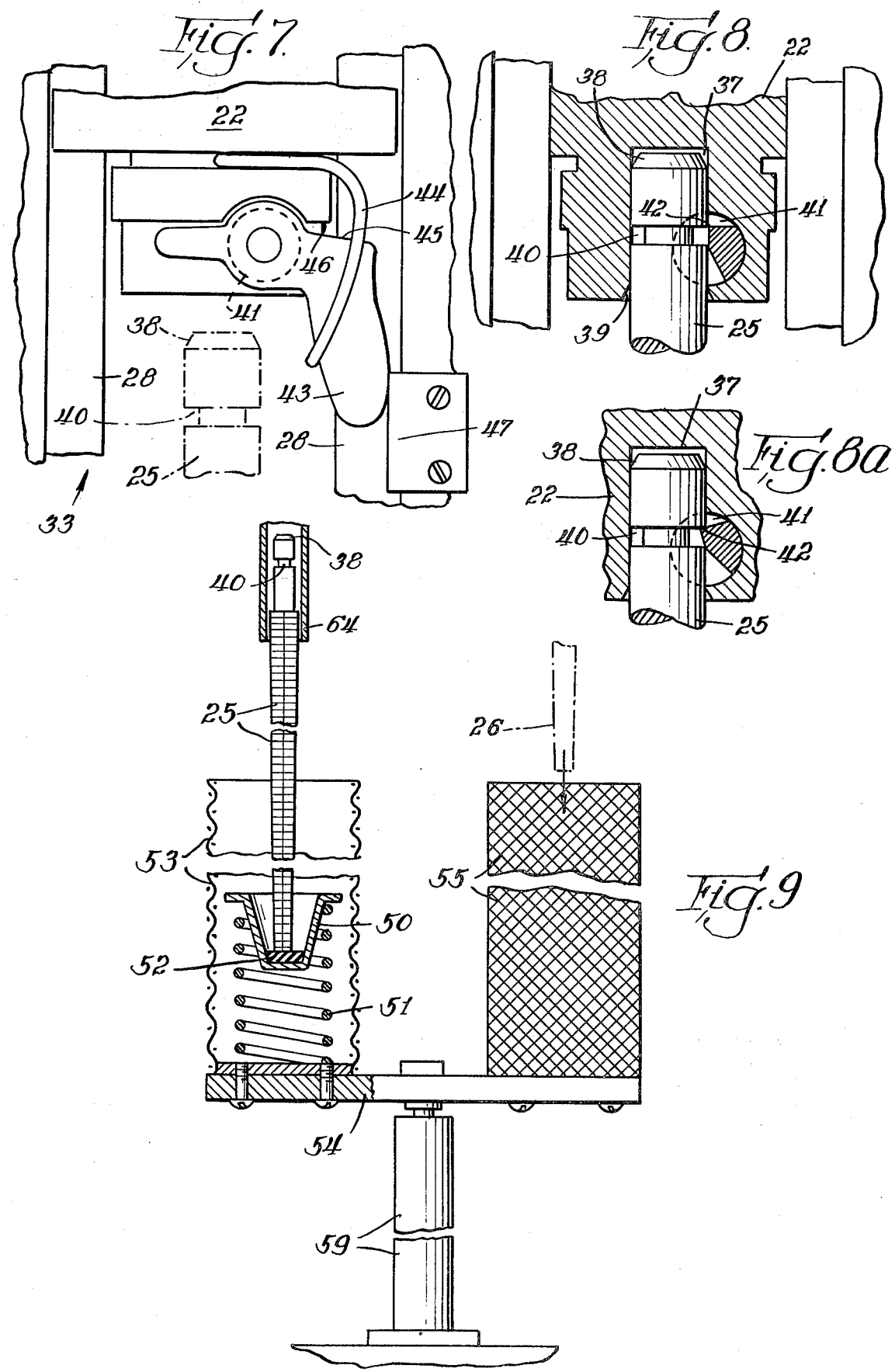

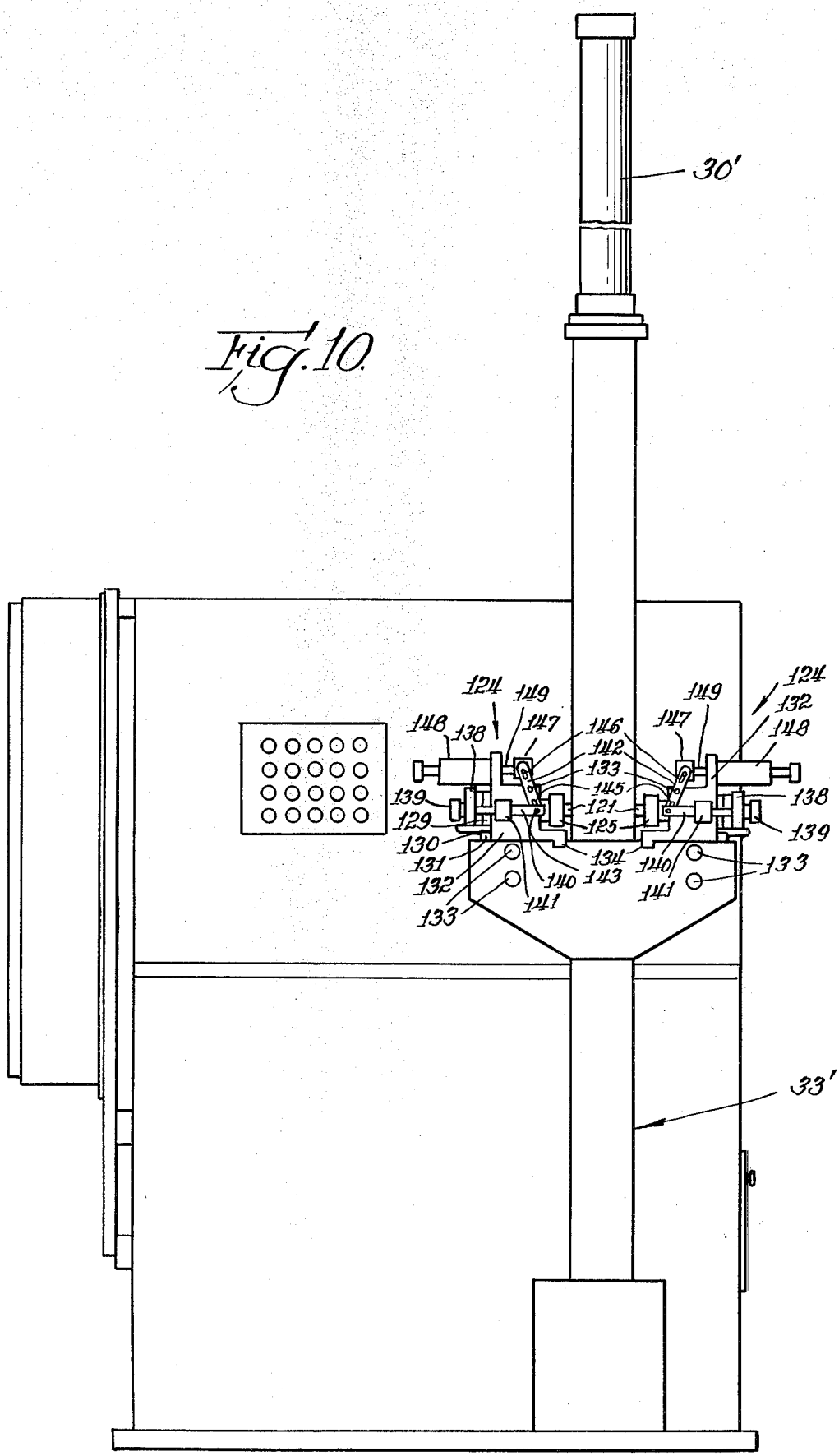

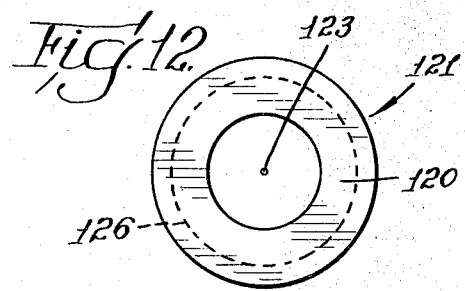
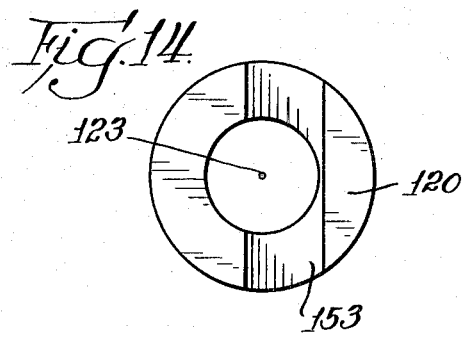
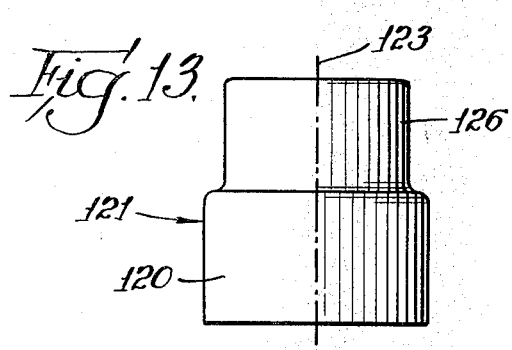
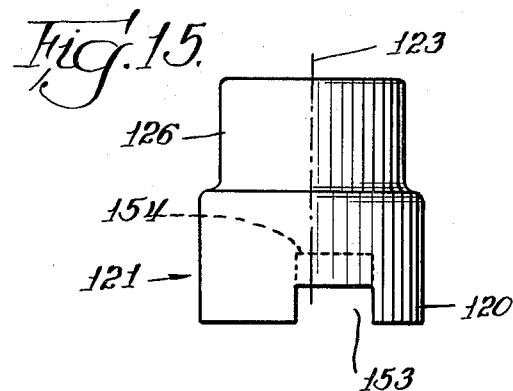
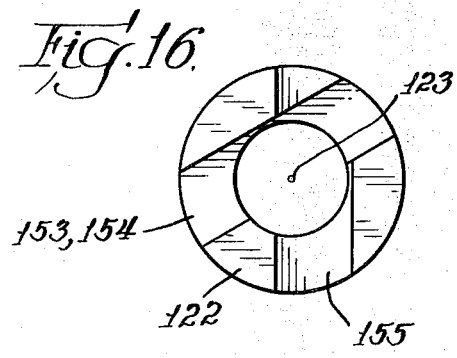
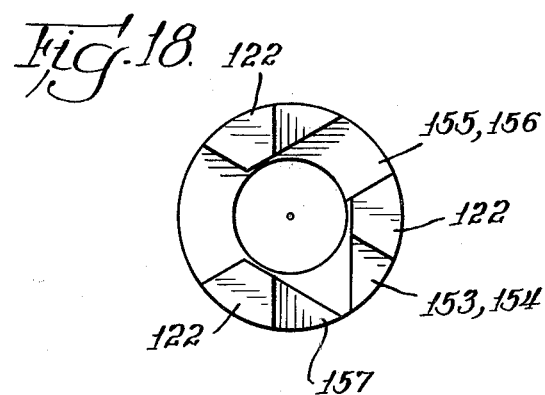
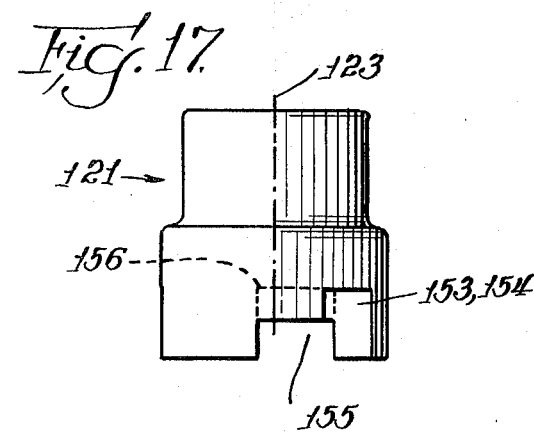
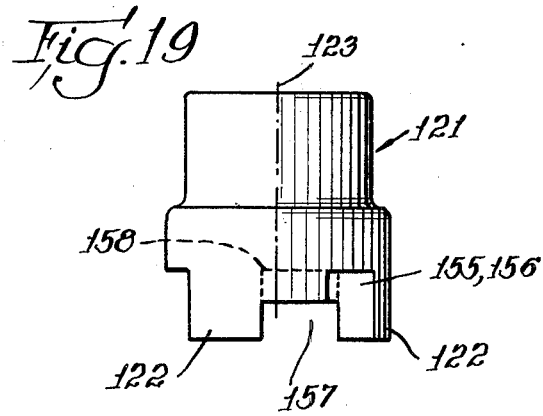

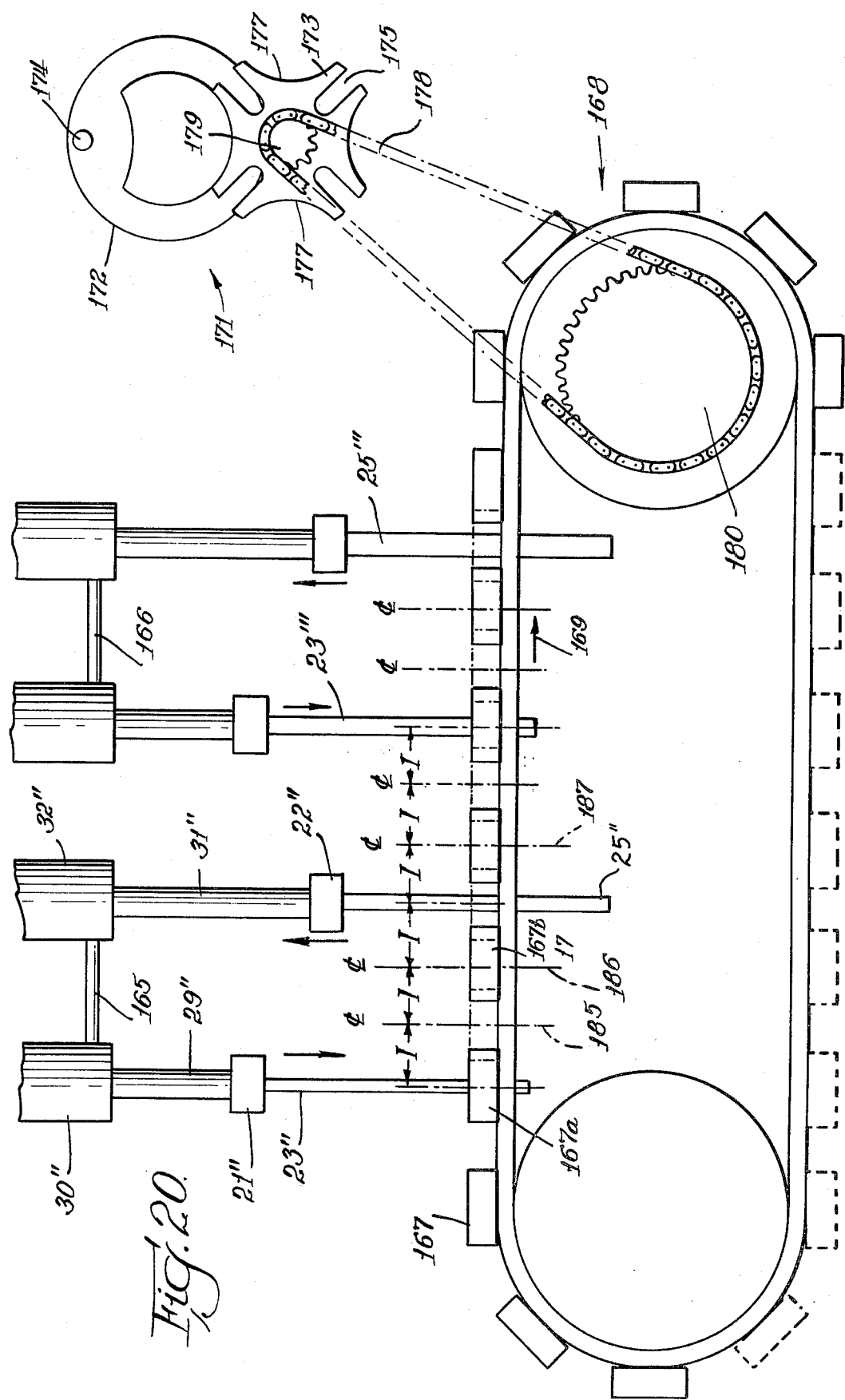

BROACHING MACHINE IMPROVEMENTS

BACKGROUND AND SUMMARY OF THE INVENTION

There are numerous small machine parts, tools and the like which can be accurately formed by broaching operations. However, the capabilities of broaches for such machining operations have not been fully utilized. It is likely this is the result of many factors, but a few of these might be noted. One undoubtedly has been the fact that historically broaching machines were large heavy pieces of equipment with very substantial capacities for applying cutting forces between a broach and a workpiece. At least in some measure this resulted from a recognition that for the broaching operation to be satisfactorily performed an exact alignment between the broach and the workpiece must be maintained, i.e., deflections of one or both could not be tolerated as metal was removed by the broach. Another factor has undoubtedly been the overall speed of operation, i.e., the number of finished parts turned out in a given period of time. While the actual removal of metal by the broach can be quite rapid, there are significant rest times between each metal removing stroke which add up to an overall machine use which is not as great as might be desired. These rest times have been in a large measure the result of the necessity of changing workpieces. To some extent, they are also the result of the necessity of returning the broach to its original position before the start of the next metal removing phase.

The principal object of the present invention is to provide broaching machines which can be utilized for forming numerous small machine parts, tools, etc., at a relatively high rate of speed. An important phase of this is to reduce the size, bulk, of the machine. This results, among other things, in better utilization of factory space and in lowered acquisition costs. Stated another way, for a machine occupying a given amount of factory space, one incorporating the teachings of the present invention will produce more machining operations in a given period of time than will the conventional broaching machine. In the present invention this is accomplished by the contributions of two factors, namely, (1) the use of two broaches mounted in balanced arrangement on a single carriage, and (2) the use of two adjacent carriages each carrying broaches with the carriages being stroked alternately.

As to the first of these features, each broach supporting carriage in the present invention has ways at one pair of opposite sides thereof, with the broaches at a second pair of opposite sides and a centrally mounted ram. Thus the loads imposed on the carriage by the broaches are balanced at each side of the ways and at each side of the ram connection. This balancing of the loads results in the ability to reduce the sections of the members which make up the carriage, the ways, etc.; or, to put it another way, the deflection causing loads which must be resisted are not as serious as in the case with the conventional broaching machine. I am aware that there have been prior art broaching machines having a carriage which could be tooled on opposite sides, but such machines had the tooling cantilevered out on the carriage from a ways at one side only of the carriage. As a consequence, there was not the balancing of the broaching forces which must be resisted by the ways as is achieved by the present invention.

Insofar as the second feature is concerned, i.e., the alternate stroking of two adjacent carriages, this permits a single workpiece feeding apparatus to be utilized to feed two broaches. Obviously, this will result in fewer mechanical components for an apparatus capable of the same amount of output; less bulk of a machine having the same output; the use of two broaches making successive cuts with the second deepening the cut of the first; etc. Various types of feeding operations that can be used utilizing this dual carriage arrangement are subsequently described herein and further specific advantages will become more apparent in connection with those descriptions.

Another factor that contributes substantially to the advantageous use of embodiments of the present invention is the release of the broach from the carriage at the end of the cutting stroke and the return of the broach to the carriage after the just-machined workpiece is removed from the position it occupied during the machining stroke. For example, this simplifies the workpiece holder since it is not necessary that it resist forces applied to the workpiece during the return stroke of the broach. This simplification of the workpiece holder also results in a simplification of the feeding of workpieces to the holder and, in many instances, will actually increase the production rate due to less time lost in replacing workpieces. Also, it permits the discharge of the just-machined workpiece to commence almost as the broaching stroke ends rather than awaiting the return of the broach to its initial position before the workpiece removal can commence.

Other objects and advantages of the invention will be apparent to those knowledgeable in the art from the following description and the appended drawings.

DESCRIPTION OF THE DRAWINGS

FIG. 1 is a view of a broaching machine embodying the present invention;

FIG. 2 is a side view of the machine of FIG. 1;

FIG. 7 is a fragmentary elevational view of the carriage and showing the latch for releasably holding the broach in the carriage;

FIG. 8 is a view similar to FIG. 7 but showing the carriage in section and the interior of the latch;

FIG. 8A is a fragmentary view similar to FIG. 8, but showing the latch in broach holding position;

FIG. 9 is a fragmentary view showing the broach retrieving means which receives the broach upon its release from the carriage and subsequently returns it to the carriage;

FIG. 10 is a view similar to FIG. 1 but showing another form of workpiece feed apparatus for performing another broaching operation;

FIGS. 12 and 13 are end and side views respectively of an unmachined workpiece that might be broached in the machine of FIGS. 10 and 11;

FIGS. 14 and 15 are views corresponding to FIGS. 12 and 13 showing the workpiece after the first broach cut;

FIGS. 16 and 17 are views corresponding to FIGS. 12 and 13 but showing the workpiece after the third broach cut;

FIGS. 18 and 19 are views corresponding to FIGS. 12 and 13 but showing the workpiece after the fifth broach cut; and FIG. 20 is a diagrammatic elevational view of another form of feed apparatus usable with broaching machines of the present invention.

DESCRIPTION OF SPECIFIC EMBODIMENTS

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

FIGS. 1-9

Figure 4:
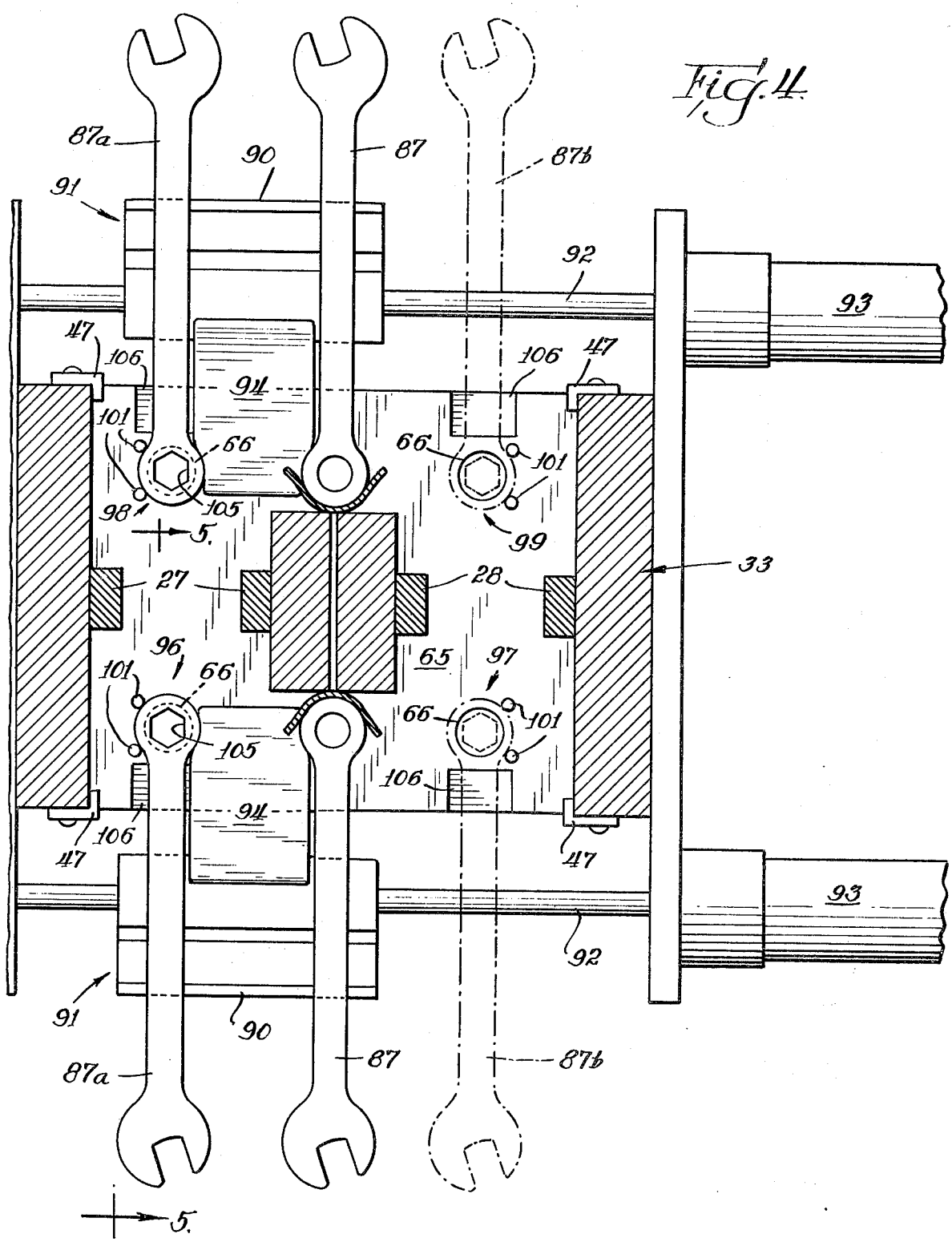
FIG. 4 is a partial section as viewed at line 4—4 of FIG. 3.
Figure 5:
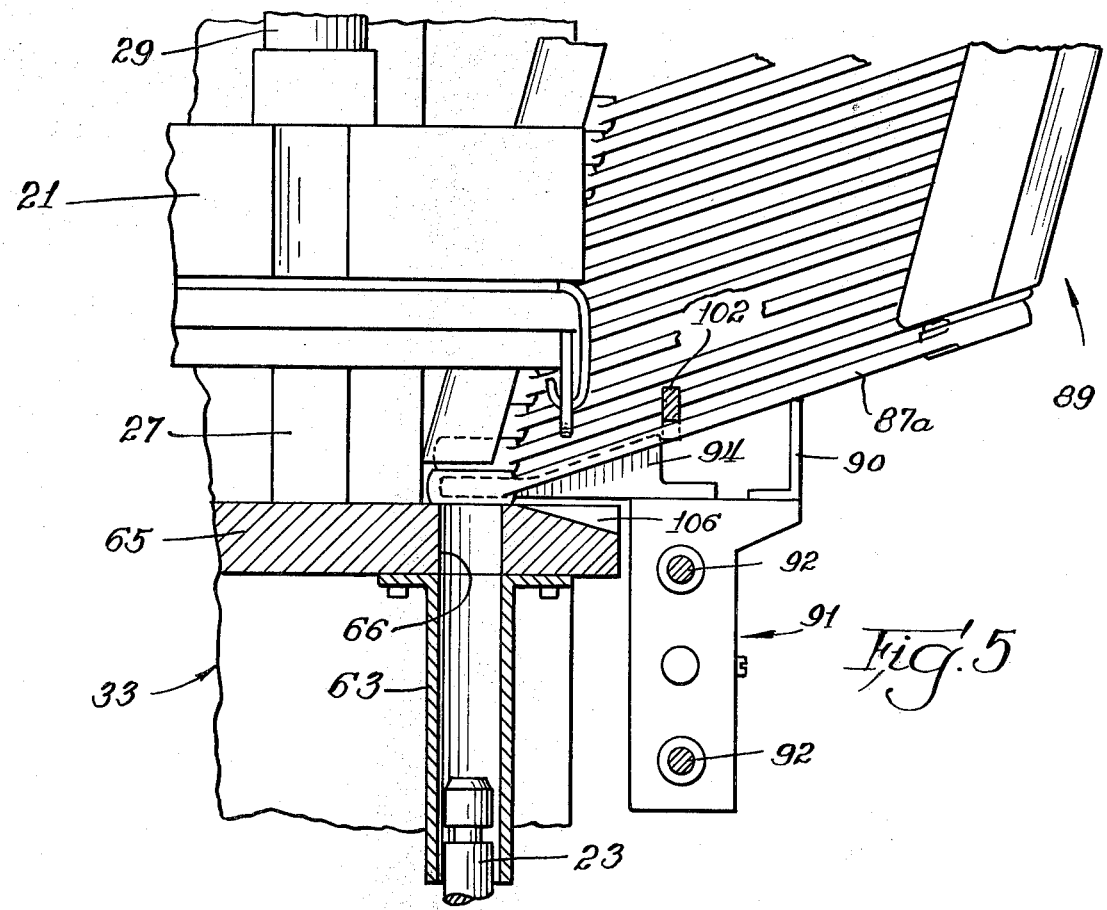
FIG. 5 is a partial section as viewed at line 5—5 of FIG. 4.
Figure 6:
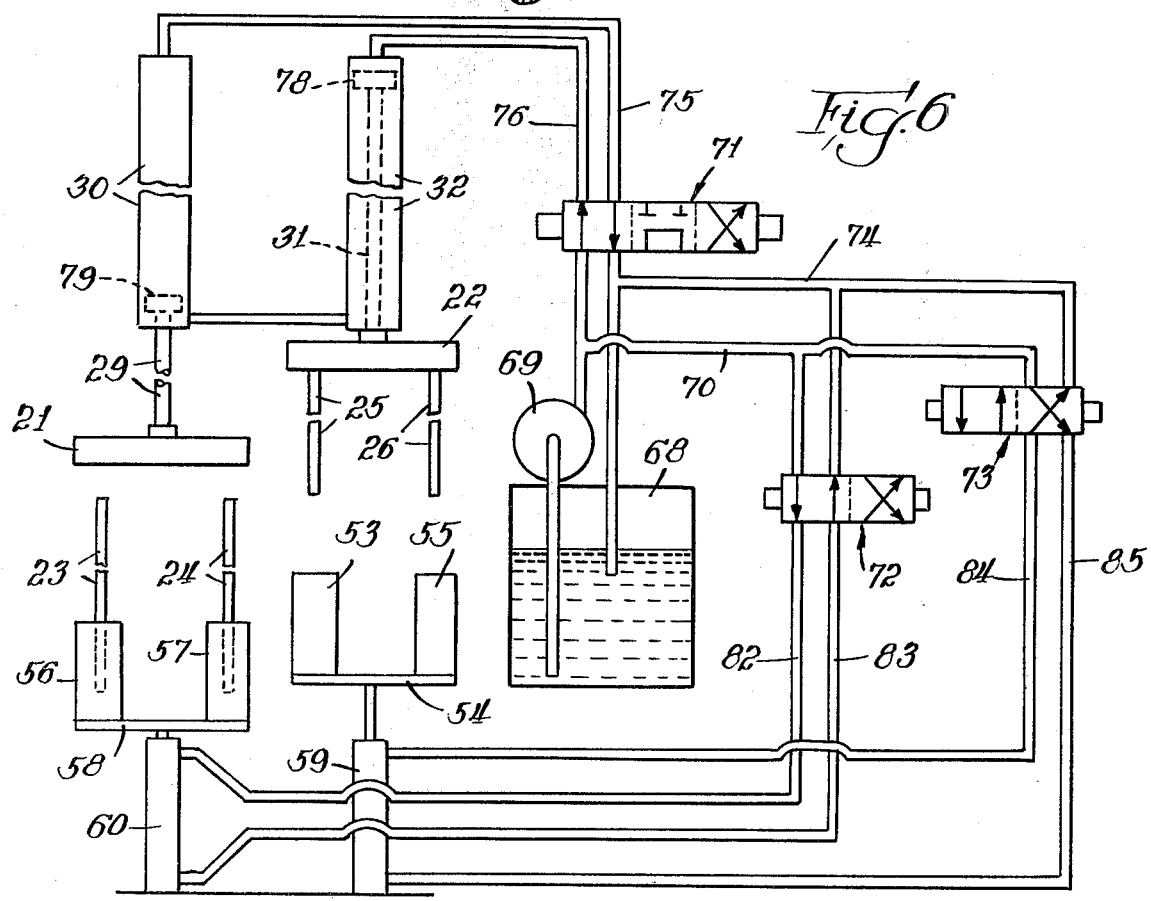
FIG. 6 is a schematic view of the hydraulic system employed in the embodiment of FIG. 1.

The machine illustrated in FIGS. 1-9 has four broaching stations, i.e., four individual broaches. To this end there are two carriages 21 and 22 each of which carries two broaches, there being broaches 23 and 24 on carriage 21 and broaches 25 and 26 on carriage 22 (FIG. 6). Carriage 21 is guided for vertical movement by ways 27 and carriage 22 is similarly guided for vertical movement by ways 28. The piston rod 29 of a hydraulic ram 30 is secured to carriage 21 centrally thereof. Similarly, the piston rod 31 of ram 32 is secured centrally to carriage 22. The ways 27 and 28 form a part of the machine frame, generally 33. The rams, of course, are secured to this frame. The frame also forms a housing 34 in and on which various of the machine components are mounted.

The broaches are releasably held in the carriages by latch devices best seen with reference to FIGS. 7, 8 and 8A. To this end, at each broach location there is a socket 37 into which the top of the broach fits. To facilitate guiding the broach into the socket the top of the broach is chamferred as at 38 and the bottom of the socket is chamferred as at 39. The top portion of the broach that fits within the socket has an annular groove 40. The latch includes a circular pin 41 journaled in the respective carriage for rotation about its longitudinal axis. Between the ends of the pin and at a location opposite the top of the broach, the majority of the pin is cut away leaving a nose 42. Externally of the carriage, an operating lever 43 is secured to pin 41. A spring 44 interconnecting the carriage and the lever urges the lever, and thus the pin, in a direction such as to move nose 42 into the socket 37 (counterclockwise in FIGS. 7 and 8). Thus the nose 42 will be urged to the position illustrated in FIG. 8A wherein it projects into groove 40 in the broach and holds the broach to the carriage during the upward stroke of the two. The portion 45 of lever 43 will move against abutment 46 of carriage 22 to limit the extent of the rotational movement of the pin when the broach is not in the socket.

At the location of the lever 43 when the carriage has moved fully down (at the completion of the cutting or broaching stroke of the carriage) there is a cam 47 secured to frame 33. When the lever 43 moves against this cam 47, the lever is rotated clockwise as viewed in FIG. 7, thus rotating the pin 41 to the position illustrated in FIG. 8. In this position the nose 42 is no longer engaging the broach. This permits the broach 25 to fall free of the carriage.

Figure 3:
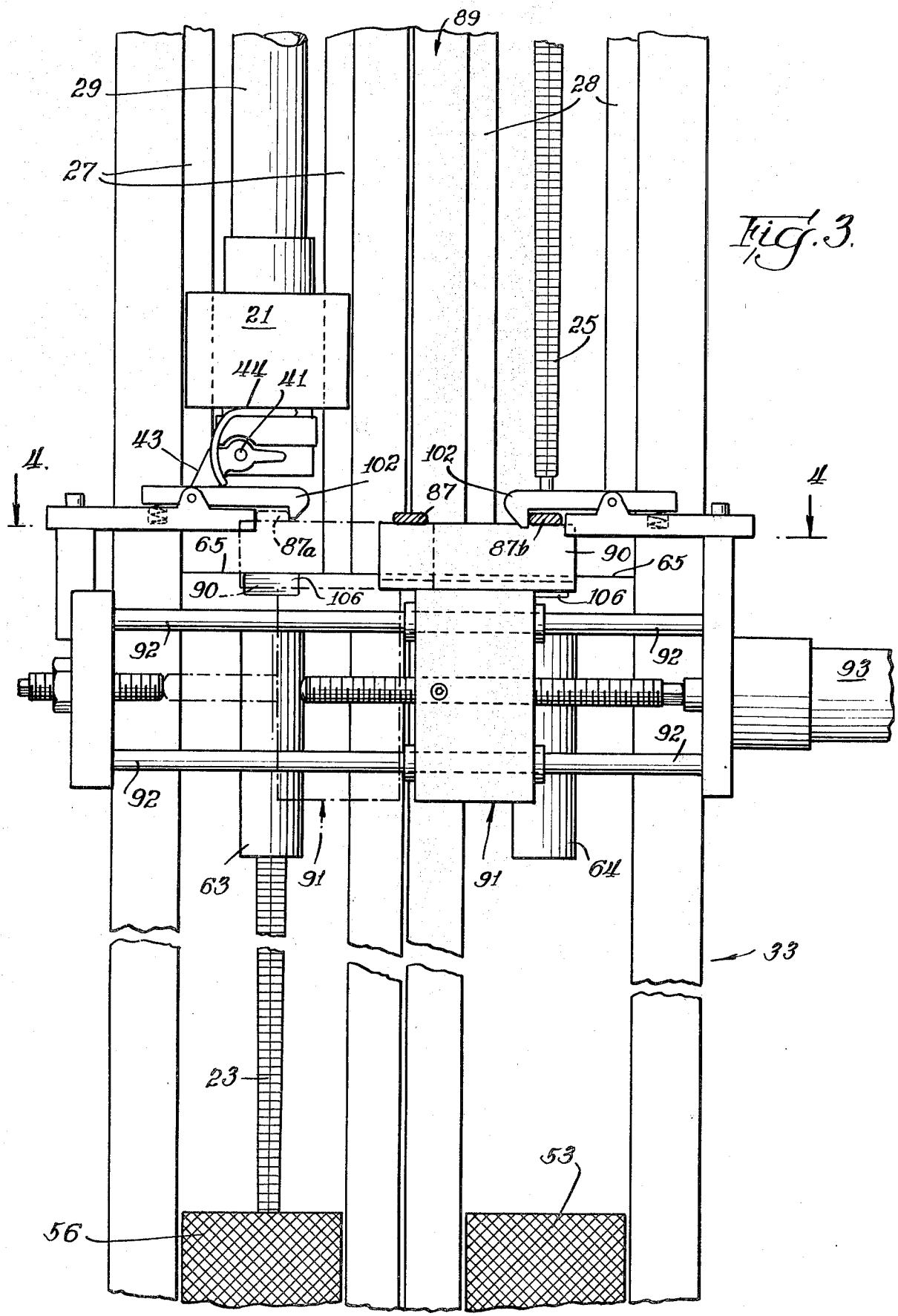
FIG. 3 is an enlarged fragmentary view of the machine as viewed in FIG. 2.

Below each broach is a broach retrieving device, best seen with reference to FIGS. 3 and 9. This device includes a funnel-shaped cup 50 supported by a spring 51. At the base of the cup is a resilient pad 52. Surrounding the cup is a wire or expanded metal cage 53. In turn the cage is carried by a support member 54. This support member also carries a second, corresponding, retrieving device associated with broach 26, which second device includes a similar cage 55. As seen in FIG. 6, there are retrieving devices, including cages 56 and 57, associated with broaches 23 and 24, respectively. These latter two cages are mounted on a support member 58. Support members 54 and 58 are secured to the piston rods of rams 59 and 60, respectively.

The broach retrieving devices also include fixed sleeves immediately below the workpiece or broaching stations. Thus there are sleeves 63 and 64 associated with the broaches 23 and 25, respectively. As best seen in FIG. 5, these sleeves are secured to a workpiece support plate 65 forming a part of the frame 33. This plate has an opening 66 through which the broach passes while the workpiece is supported on the top of the plate in alignment with the opening. The sleeve is sufficiently long so that the top of the broach remains in the sleeve after the broach has dropped free of the carriage (best seen in FIG. 9). As the broach is subsequently raised to be inserted into the carriage, the sleeve maintains the proper alignment of the broach so that it will enter the socket in the carriage.

The hydraulic system is diagrammatically illustrated in FIG. 6. The hydraulic fluid is withdrawn from a reservoir or sump 68 by a hydraulic pump 69 and introduced into a pressure conduit 70 leading to valves 71, 72 and 73. A return conduit 74 extends from the valves to the reservoir. Conduits 75 and 76 extend from valve 71 to the tops of rams 30 and 32, respectively. The bottoms of the hydraulic cylinders of rams 30 and 32 are connected by a conduit 77 through which they are in constant communication. With one setting of valve 71 (the setting illustrated) hydraulic fluid is pumped into the cylinder of ram 32 causing the piston rod to extend. As this movement occurs the piston 78 of that ram pumps hydraulic fluid from the cylinder of ram 32 through conduit 77 into the cylinder of ram 30. This hydraulic fluid acting upon piston 79 of ram 30 causes the retraction of the piston rod 29 of that ram. The hydraulic fluid above piston 79 returns through conduit 75 and valve 71 to the reservoir or sump 68. Valve 71 is, of course, resettable so as to apply hydraulic fluid under pressure through conduit 75 to the top of the cylinder of ram 30 thus causing the extension of the piston rod of that ram and in turn the retraction of the piston rod 31 of ram 32.

From valve 72 conduits 82 and 83 extend to the top and bottom respectively of ram 59. Similarly, conduits 84 and 85 extend from valve 73 to the top and bottom of ram 60. The hydraulic flow arrangement is such that the pistons and piston rods of rams 59 and 60 move at a substantially greater rate of speed than do the pistons and piston rods of rams 30 and 32.

The embodiment of FIGS. 1-9, as illustrated, is for the broaching accurately to size of the openings in wrenches 87, the wrenches being of course the workpieces. As illustrated, the box ends of these wrenches are being broached. The wrenches are stacked vertically in a magazine or chute, generally 88 and 89. Each magazine is at a respective side of the machine with its bottom end between the two work stations (broaching locations) at that side. The end of the wrench to be broached is resting upon support plate 65. Beyond the midpoint of the wrench it rests on a support 90 of a transfer carriage, generally 91. This carriage is movable along ways in the form of rods 92 forming a part of the machine frame. It is secured to the piston rod of a hydraulic ram or air cylinder 93 which reciprocates the carriage back and forth as required. Depending upon the position of the carriage 91, one side of a raised abutment 94 thereon is in juxtaposition to the side of the bottom wrench 87 in the magazine. With the position of the bottom carriage as illustrated in FIG. 4, is the right side of the abutment that is in juxtaposition to the bottom wrench of the magazine; while when the carriage has moved to its right hand position in FIG. 4, it is the left side of abutment 94 that is in juxtaposition to the bottom wrench of the magazine. Thus as the carriage moves from one side to the other it transfers the bottom wrench from the magazine first to one broaching station and then the next bottom wrench to the second broaching station. The four individual broaching stations are indicated by the numbers 96–99, generally.

As a wrench is moved into a broaching station by the transfer carriage 91, its motion is arrested by pins 101 and the transfer carriage presses the end of the wrench against those pins. This effectively positions the wrench to receive the broach.

As a wrench is moved to a broaching station it moves under and raises a spring-loaded latch 102. Upon coming to rest at the broaching station, the latch drops over the wrench to prevent the wrench from moving with the carriage when the carriage makes its return motion.

Operation: FIGS. 1–9

While the description of the operation will be primarily directed to what occurs at the front side of FIG. 2 (the lower half of FIG. 4; and FIG. 5) the description is equally applicable to the other side of the machine (the top half of FIG. 4) since that other side is but a mirror image of the front side. As a starting point for the description it is assumed that the piston rod 29 of ram 30 has just completed its maximum extension, i.e., the end of the cutting or broaching stroke. The latch (corresponding to the structure illustrated in FIGS. 7 and 8) has just released broach 23 and the broach has at least commenced its descent into broach retrieving device of which cage 56 is a part. Thus the opening 105 in wrench 87a has just been broached.

At this point the ram or air cylinder 93 moves transfer carriage 91 to the right. This movement causes abutment 94 to pick off the bottom wrench 87 from the magazine 89 and transfer it to the position indicated in dot-dash lines and identified as 87b. When the carriage comes to rest, the end of the wrench to be broached is trapped between pins 101 and the side of abutment 94. As the carriage moved away from wrench 87a that wrench was restrained against a corresponding movement by latch 102. Thus with the continued movement of the carriage the point was reached at which the support 90 of the carriage was no longer under wrench 87a. At this point gravity takes over and the wrench falls downwardly. The sloping edge 106 of support plate 65 (FIG. 5) facilitates the wrench falling away from the broaching station 96. The wrench falls into a chute 107 and from there to a suitable container, etc., not shown.

At about the time that the wrench 87 from the magazine arrives at the location illustrated by 87b the valve 71 arrives at the position illustrated in FIG. 6. This results in hydraulic fluid under pressure being applied to the top of ram 32, with the top of ram 30 being free to discharge hydraulic fluid into reservoir 68. The pressurized fluid at the top of ram 32 forces piston 78 down with the result that broach 25 enters the opening in wrench 87b to form that opening into the desired shape. The hydraulic fluid below piston 78 is pumped by that piston into conduit 77 and thus into the bottom of ram 30. That hydraulic fluid acts on piston 79 to force it upwardly raising carriage 21. This interconnection of the two rams through conduit 77 has several advantages. In the first place, it reduces the volume of hydraulic fluid that must be pumped by the pump 69. To this extent a smaller capacity pump can be employed. Additionally, the actions of the two rams are tied together in a manner such that they necessarily move together. There is no possibility for their getting out of phase with each other.

As previously mentioned, the broaches 23 and 24 will have previously dropped free from carriage 21 so that they are not moved upwardly with this upward movement of the carriage. After a sufficient delay for wrench 87a to have fallen away from work station 96, as previously described, the valve 73 is repositioned to apply the pressurized hydraulic fluid to the bottom of ram 60. Thus the broach retrieving devices which are holding broaches 23 and 24 go up. Since hydraulic fluid is being supplied to ram 60 at a rate in excess of that which it is being supplied to ram 32 (considering the relative cubic capacities of the rams), the broaches move upwardly faster than does carriage 21 so that the broaches catch up with the carriage before the carriage reaches the top of its return stroke. As the broaches reach the carriage they are inserted into socket 37 as a result of their faster upward movement. Since handle 43 of the catch is free of cam 47 it has moved substantially to the position illustrated in FIG. 8A under the influence of spring 44. However, the chamfer 38 on the top of the broach contacts the angular face below nose 42 and cams the pin 41 to rotate sufficiently in a clockwise direction (as viewed in FIGS. 8 and 8A) to permit the broach to pass the nose and move into the socket 37 to substantially the position illustrated in FIG. 8. Upon nose 42 becoming aligned with groove 40 in the broach, the pin 41 is free to rotate counterclockwise under the influence of spring 44 permitting nose 42 to enter the groove in the manner illustrated in FIG. 8A. The broach is now locked in the carriage so that it is held by the carriage even though valve 73 is repositioned to the position illustrated in FIG. 6 so that the cages 56 return to their lowered position.

It should be noted that as the broach is going down and is removing metal from the workpiece, the force required to force the broach down is not transmitted from the carriage to the broach through nose 42 of the broach retaining catch. Instead, the top of the broach settles against the carriage at the blind end of socket 37 so that the force required for the metal cutting operation is applied directly to the broach by the carriage. As this occurs the pressure of the broach on nose 42 can push that nose back out of the way by rotating the pin so that the nose is no longer holding the broach in place. However, the broach will not fall free of the socket until the cutting is completed.

When the carriage 22 arrives at the bottom end of its cutting stroke, the two catches associated with broaches 25 and 26 are actuated (as described with respect to FIGS. 7 and 8) so as to release those two broaches and permit them to fall free into their respective broach retrieving devices. The ram or air cylinder 93 is then actuated to move carriage 91 in a direction so as to return to the position illustrated in FIG. 4. This permits the wrench at location 87b to fall away, i.e., be discharged. The movement of the carriage picks up another wrench from the bottom of the magazine and transfers it to the location illustrated at 87a. Valve 71 is repositioned to cause fluid under pressure to be applied to conduit 75 and to cause conduit 76 to be connected to the reservoir. Thus the carriages 21 and 22 commence returning to the positions illustrated in FIG. 6. Valve 72 is repositioned to reinsert broaches 25 and 26 into carriage 22, in the manner described above with respect to broaches 23 and 24.

A conveyor 110 is driven by a motor 111 to remove the metal chips which are cut from the workpiece during the broaching operation. These metal chips fall onto the conveyor and are carried away by the conveyor for discharge into a suitable container, not shown.

FIGS. 10-19

Figure 11:
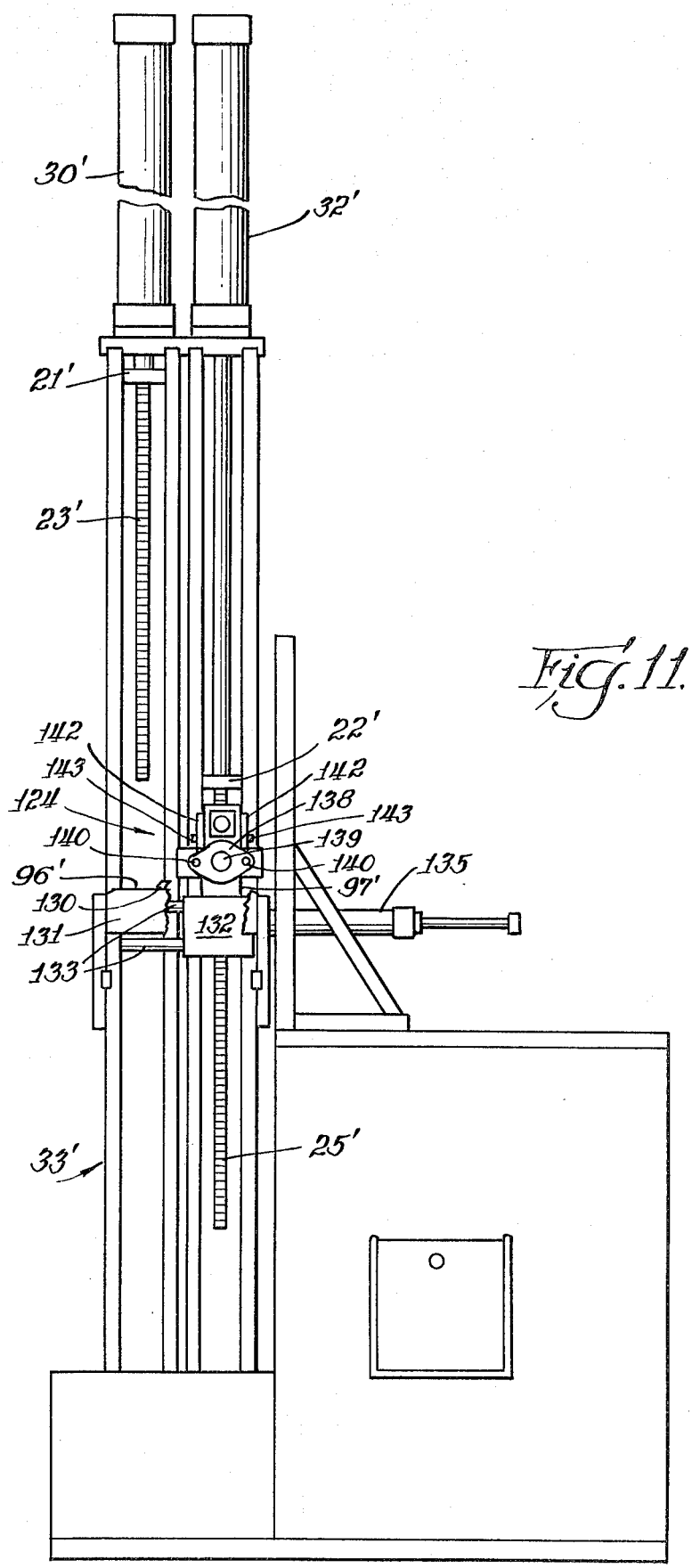
FIG. 11 shows the embodiment of FIG. 10 as viewed from another side.

In most respects the embodiment illustrated in FIGS. 10 and 11 correspond to the embodiment of FIGS. 1-9. This machine, however, is a higher capacity machine to apply greater force to the broaches. The arrangement of the frame 33' has been modified so far as the location of some of the control components, etc., are concerned.

Like the previously described embodiment, there are two carriages 21' and 22' mounted for vertical movement in ways forming a part of frame 33'. The carriages are connected to rams 30' and 32', respectively, which results in the vertical reciprocation of the carriages in the manner illustrated and described in connection with FIG. 6. Each carriage carries a pair of broaches. In FIG. 11 one of the two broaches held by carriage 21' is illustrated at 23' and one of the two broaches attached to carriage 22' is illustrated at 25'. As in the embodiment of FIGS. 1-9, the pair of broaches on each carriage are balanced at opposite sides of the piston rod and balanced with respect to the ways.

This embodiment is set up for a machining operation on the end 120 of a workpiece, generally 121. When the machining is completed, this workpiece will form one component of a flexible coupling for rotating shafts. For this purpose, the end 120 is to have three projections 122 thereon of equal length and spaced at a hundred and twenty degree intervals (center to center) about the axis 123 thereof.

In this embodiment the workpiece positioning device, generally 124, includes a chuck or collet 125 which grips end 126 of the workpiece in a manner such that the end 120 of the workpiece is held in the paths of the broaches as hereinafter described. The chuck is connected by a shaft 128 to a one-way clutch 129. The axis of the shaft 128 and of the chuck 125 coincide with axis 123 of the workpiece. The clutch holds the workpiece immovable about this axis when a machining operation is taking place. As the workpiece is transferred from station 97' to 96' a finger 130 engages the clutch to rotate it and thus the shaft and workpiece a hundred and twenty degrees about the axis. However, when the workpiece is moved from station 96' to station 97', the finger pivots clockwise (as viewed in FIG. 11) against the resistance of a loading spring (not shown) to move out of the way, thereby being ineffective to actuate the clutch and the workpiece stays in its established position. The finger and its spring are mounted on a crossbar 131 which is a part of frame 33'.

The workpiece positioning device includes a carriage 132. At one end this carriage is slidable on round rods 133 forming ways and being a part of frame 33'. At the other end the carriage includes a rectangular guide bar 134 which slides in a rectangular slot in frame 33' which forms a way. The carriage is attached to the piston rod of an air or hydraulic cylinder 135 which shifts it back and forth along the ways.

Shaft 128, which connects to chuck 125 extends through a clutch operating plate 138 and has a head 139 on its distal end. This head is larger than the opening in plate 138 through which the shaft extends. Plate 138 is secured to the ends of a pair of actuating rods 140. These rods are journaled in bearings 141 which support the rods but permit them to move longitudinally. Bearings 141 form a part of the carriage 132. Actuating levers 142 are pivotally connected to carriage 132 by pins 133. A pin 134 on each of rods 140 extends into slots 145 respectively in one of the ends of each of levers 142. Similar slots 146 adjacent the other ends of each of the levers respectively receive pins extending from block 147. An air or hydraulic cylinder 148 has a piston rod 149 which is secured to block 147. Thus as the piston rod and block move to the right in FIG. 10 lever 142 is pivoted clockwise and the lever in turn pushes rods 140 and a clutch operating plate 138 to the left. When this happens the clutch operating plate engages head 139 of the clutch shaft 128 to move the clutch shaft longitudinally to the left. This causes the chuck or collet to release the workpiece 121 to permit it to be removed and another workpiece inserted.

Operation: FIGS. 10-19

With the workpiece positioning device 124 at broaching station 96' and with an uncut workpiece (FIGS. 12 and 13) in the chuck or collet 125, the broach 23' is driven down from the position illustrated in FIG. 11 by the ram 30'. As this occurs, the broach 23' makes a cut 153 across the end 120 of the workpiece. With the broach 23' out of the way (as for example being dropped off the carriage 21' as described with respect to the embodiment of FIGS. 1-9) the cylinder 135 moves carriage 132 to the position illustrated in FIG. 11. At this time, of course, the carriage 22' and the respective broach 25' are in the raised position. During this transitional movement of carriage 132 the workpiece remains stationary about axis 123. The broach 25' is then driven downwardly to make a second cut 124. Thus broach 25' was in alignment with the first cut 153, but it is of a size to deepen that first cut.

Again, with broach 25' out of the way, the carriage 132 is returned to work station 96' by cylinder 135. As it does so the one-way clutch 129 is actuated to rotate the workpiece one hundred and twenty degrees about is axis 123. Thus the previous two cuts 153, 154 are moved from the alignment shown in FIG. 14 to the alignment shown in FIG. 16. Broach 23' now makes a third cut 155 (FIGS. 16 and 17). Carriage 132 then moves the workpiece to work station 97' where broach 25' makes forth cut 156 depending the third cut 155. The carriage 132 then returns the workpiece to work station 96' and as it does so, the workpiece is rotated one hundred and twenty degrees about axis 123. Thus the workpiece moves from the position illustrated in FIG. 16 to the position illustrated in FIG. 18. Broach 23' now makes a fifth cut 127 and when the workpiece is again moved to work station 97' the broach 25' makes a sixth cut 158, deepening the cut 157. At that point the end 120 of the workpiece has been fully formed with three projections 122 as required. The workpiece thus formed is removed from the chuck and a subsequent, uncut workpiece is positioned in the chuck.

The foregoing description as to the operations performed on one side of the machine (the side shown in FIG. 11 and at the right in FIG. 10) is equally applicable to what occurs at the opposite side of the machine (the side to the left in FIG. 10).

FIG. 20

FIG. 20 diagrammatically illustrates another application of the invention. As illustrated, there are two broaching machines, generally 165 and 166, side by side. Each machine is a duplicate of the other and generally of the character described with respect to FIGS. 1-9. Only the operation of machine 165 will be described in detail and it will be readily apparent that the description is equally applicable to machine 166. A broaching operation on a particular workpiece could be carried out without the presence of machine 166, but it is present in the drawing merely to illustrate that additional, successive broaching operations may be performed on the same workpiece utilizing the concepts of the present invention.

The workpieces 167 to be broached are held at specific locations on a conveyor, generally 168. This conveyor moves the workpieces intermittently along a path below the broaches in a direction indicated by arrow 169. Between each period of movement of the conveyor there is a dwell during which the workpiece remains stationary.

For the purpose of illustrating such intermittent movement, there is a Geneva wheel, generally 171. This comprises a motor driven disc 172 which is the driving disc, and a driven disc 173. The driving disc has a pin 174 which enters one of slots 175 during each revolution of the driving disc and results in a turning of the driven disc through ninety degrees. The driving disc has a concentric surface 176 which fits in one of the concave surfaces 177 to hold the driven disc 173 stationary between its periodic ninety degree movements. Thus the driven disc has intermittent movements between which are dwell periods. A chain 178 connects a sprocket 179 secured to the Geneva wheel with a sprocket 180 of the conveyor 168. Thus the conveyor is intermittently driven a given amount and has a corresponding dwell period between each pair of its movements.

The center lines of the two broaches of each machine will be a given distance apart and this distance is divided into thirds to determine the amount that the conveyor must move a workpiece during each of the movements of the conveyor by the Geneva wheel or the like. Thus the broaches 23" and 25" of machine 165 are spaced a distance 3I apart and the distance of each movement of the workpiece by the conveyor is designated I in the drawing (indexing distance).

The arrangement of the length of the broaches with respect to the amount of their travel (i.e., the length of stroke of the piston rods 29", 31") is such that there will be a period during which both of the broaches are above the level of the workpieces. It is during this period that the conveyor 168 moves the workpieces. When one or the other of the broaches is acting on a workpiece, the conveyor is stationary. As described with respect to the embodiment of FIGS. 1-9, the piston rods 29" and 31" move alternately up and down.

As illustrated in FIG. 20, broach 23" is moving downwardly and making a cut on workpiece 167a. There is no workpiece below broach 25" so it is freely moving upwardly. With both broaches partially raised, the conveyor 168 moves the workpieces in the direction of arrow 169 a distance I. Thus the workpiece 167a moves so that its center line (or the center line of the cut location) is at dot-dash line 185. At the same time, the workpiece 167b moves so that its center line (or the center line of the cut location) is aligned with the center line of broach 25". Thereafter while broach 23" is continuing its upward movement and broach 25" is continuing its downward movement the broach 25" makes a cut on the workpiece 167b. The two broaches then commence moving in the reverse direction and when both are above the workpieces, the workpiece 167a indexes forwardly so that its center line moves from dot-dash location 185 to dot-dash location 186; and this second indexing movement of the conveyor brings the workpiece 167 to the location at which workpiece 167a is illustrated. The same indexing step moves workpiece 167b so that its center line is at dot-dash line 187. The continued downward movement of broach 23" then causes that broach to make a cut upon the repositioned workpiece 167.

As illustrated in FIG. 20, the two machines 165 and 166 are positioned so that their adjacent broaches are spaced apart by a distance of 3I. Thus the workpieces move from the second work station of machine 165 (as represented by broach 25") to the first work station of machine 166 (as represented by broach 23'''') in the same manner as just described with respect to the operation of machine 165. Of course, broaches 23''' and 25''' of machine 166 are likewise spaced apart a distance of 3I center to center.

I claim:

1. A broaching apparatus for use with workpieces and comprising a frame including longitudinal ways, a carriage movable along said ways and having broach holding means thereon, workpiece positioning means mounted on the frame, and a ram connected between the carriage and the frame for reciprocating the carriage, characterized by:
   said ways being opposite each other with said carriage therebetween;
   said carriage having four sides comprising two pair of sides with the sides of each pair being opposite each other, the sides of one of said pair engaging said ways;
   said broach holding means comprising two broach holders, with a respective one being at each of the sides of the other pair;
   said ram being secured to the carriage centrally between said ways and centrally between said broach holders; and
   said workpiece positioning means comprising two workpiece holders, with a respective one being adjacent each of the sides of the other pair;
   whereby during a broaching movement of the carriage the loading of the carriage from the broaches and broach holders is balanced with respect to the mounting of the carriage on the ways and its connection to the ram.

2. A broaching apparatus as set forth in claim 1 and including hydraulic power means connected to said ram for actuating the ram and moving the carriage, characterized by:

said frame including second ways adjacent and spaced from the first mentioned ways and generally parallel thereto;

a second carriage mounted in said second ways and having broach holding means;

a second ram connected between the frame and the second carriage for reciprocating the second carriage;

each ram including a hydraulic cylinder having two ends such that when hydraulic fluid is applied to a first of the ends the carriage moves through a broaching stroke and when hydraulic fluid is applied to the second of the ends the carriage moves through a retraction stroke;

a fluid conduit connecting the second ends of the two cylinders whereby said second ends are in constant fluid communication with each other; and said hydraulic power means being connected to said first ends of the two cylinders for applying hydraulic fluid under pressure alternately to the two cylinders and receiving the hydraulic fluid from the cylinder to which the pressurized hydraulic fluid is not being so applied;

whereby the rams are actuated alternately for broaching strokes of the respective carriages and the hydraulic fluid flows back and forth through said conduit to produce the carriage retraction strokes of the rams.

3. A broaching apparatus as set forth in claim 2, wherein said broach holding means of said second carriage comprise individual broach holders respectively adjacent a first pair of opposite sides of the second carriage, said second carriage having a second pair of opposite sides at which it is mounted in said second ways, said second ram being connected to said second carriage intermediate said second pair of opposite sides thereof and intermediate the last mentioned broach holders.

4. A broaching apparatus as set forth in claim 3, wherein said workpiece positioning means includes a first broaching station generally to one side of the first carriage and a second broaching station generally to said one side of the second carriage;

including workpiece supply means for delivering one workpiece at a time to a location intermediate said two broaching stations; and including workpiece feeding means for transferring the workpieces from said location to said broaching stations alternately.

5. A broaching apparatus as set forth in claim 4 and including broaches for each broach holders, characterized by:

said ways being positioned so that the carriages move vertically;

said broaching strokes being downward movements of the carriages;

said broach holding means releasably engaging the respective broaches and releasing said engagement after the commencement of the broaching stroke while continuing to force the broach into engagement with the workpiece through the cutting part of the broaching stroke whereupon the broach is permitted to fall free of broach holding means;

said workpiece positioning means causing the workpiece to be discharged therefrom after the completion of the broaching stroke and during the separation of the broach from the broach holding means;

including broach retrieving means for catching the broach at a level below the workpiece positioning means and returning the broach to the broach holding means for engagement by the broach holding means; and said workpiece feeding means transferring a workpiece to a station after the broach associated with that station has been so returned to the respective broach holding means.

6. A broaching apparatus as set forth in claim 3, wherein said workpiece positioning means includes a first station generally to one side of the first carriage and a second station generally to said one side of the second carriage;

said workpiece positioning means moving a workpiece from one station to the other between broaching strokes at the two stations so that broach cuts are made on the same workpiece first at said one station and subsequently at said other station.

7. A broaching apparatus for use with workpieces and comprising a frame, two carriages side by side on the frame with each carriage having broach holding means, ram means connected to said carriages for reciprocating the carriages alternately, workpiece positioning means comprising a first station generally to one side of the first carriage and a second station generally to said one side of the second carriage, workpiece supply means for delivering one workpiece at a time to a location intermediate said two stations, and workpiece feeding means for transferring the workpieces from said location to said stations alternately, said apparatus being characterized by:

said workpiece supply means comprising a magazine in which the workpieces are vertically stacked with a predetermined orientation, the bottom workpiece in said stack being at said location; and said workpiece feeding means comprising a transfer carriage movable between said stations and across said location, said transfer carriage having abutments facing toward each station respectively, for engaging said bottom workpiece as the transfer carriage moves toward a station and transferring that workpiece to that station.

8. A broaching apparatus as set forth in claim 7 including broaches for each broach holding means, characterized by:

said ways being positioned so that the carriages move vertically;

said broaching strokes being downward movements of the carriages;

said broach holding means releasably engaging the respective broaches and releasing said engagement after the commencement of the broaching stroke while continuing to force the broach into engagement with the workpiece through the cutting part of the broaching stroke whereupon the broach is permitted to fall free of broach holding means;

said workpiece positioning means causing the workpiece to be discharged therefrom after the completion of the broaching stroke and during the separation of the broach from the broach holding means;

including broach retrieving means for catching the broach at a level below the workpiece positioning means and returning the broach to the broach holding means for engagement by the broach holding means; and said workpiece feeding means transferring a workpiece to a station after the broach associated with that station has been so returned to the respective broach holding means.

9. A broaching apparatus for use with workpieces having two ends one of which is to be broached, and comprising a frame, two carriages side by side on the frame with each carriage having broach holding means, ram means connected to said carriages for reciprocating the carriages alternately, workpiece positioning means comprising a first station generally to one side of the first carriage and a second station generally to said one side of the second carriage, workpiece supply means for delivering one workpiece at a time to a location intermediate said two stations, and workpiece feeding means for transferring the workpieces from said location to said stations alternately, said apparatus being characterized by:

said workpiece positioning means including a part of said frame at each of said stations to support the one ends of the workpieces;

said transfer carriage having a portion supporting said one workpiece intermediate its ends as the transfer carriage so moves toward a station and so long as it is adjacent said station, said portion moving out from under that one workpiece as the transfer carriage moves away from said station whereby the one workpiece will fall away from said station; and including means engaging a side only of said one workpiece at said station and preventing said portion from dragging the one workpiece with the transfer carriage as it moves away from said station while not interfering with said fall of the one workpiece from the station.

10. A broaching apparatus and comprising a frame, two carriages side by side on the frame with each carriage having broach holding means and a broach held thereby, ram means connected to said carriages for reciprocating the carriages alternately, and workpiece positioning means, said apparatus being characterized by:

each broach moving along a respective path with the two paths being parallel, said workpiece positioning means including a first station generally to one side of the first carriage and a second station generally to said one side of the second carriage, said workpiece positioning means moving a workpiece from one station to the other between broaching strokes at the two stations so that broach cuts are made on the same workpiece first at said one station and subsequently at said other station, said workpiece positioning means including a chuck rotatable about an axis normal to said paths, and means for returning the workpiece from said other station to said one station following the cut at said other station and for rotating said chuck a predetermined angular amount about said axis after said cut at said other station and before a subsequent cut at said one station.

11. A broaching apparatus and comprising a frame, two carriages side by side on the frame with each carriage having broach holding means and a broach held thereby, ram means connected to said carriages for reciprocating the carriages alternately, and workpiece positioning means, said apparatus being characterized by:

said workpiece positioning means including a first station generally to one side of the first carriage and a second station generally to said one side of the second carriage;

said workpiece positioning means moving a workpiece from one station to the other between broaching strokes at the two stations so that broach cuts are made on the same workpiece first at said one station and subsequently at said other station;

said positioning means so moving said workpiece between stations in a sequence of three steps, each step occurring following a broaching movement of a carriage, said broaches being a given lateral distance apart center to center and the length of movement during each step being one-third said distance.

* * * * *